(12) United States Patent
Herrera et al.

(10) Patent No.: US 9,693,166 B2
(45) Date of Patent: Jun. 27, 2017

(54) AUTOMATED PRODUCTION OF ACOUSTIC STRUCTURES

(71) Applicant: The Boeing Company, Chicago, IL (US)

(72) Inventors: Eric Herrera, Coos Bay, OR (US); Noel Timothy Gerken, Maple Valley, WA (US); John Scott Bauman, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 273 days.

(21) Appl. No.: 14/313,613

(22) Filed: Jun. 24, 2014

(65) Prior Publication Data
US 2015/0373470 A1 Dec. 24, 2015

(51) Int. Cl.
*F02C 7/045* (2006.01)
*B25J 15/06* (2006.01)
(Continued)

(52) U.S. Cl.
CPC .......... *H04R 31/00* (2013.01); *B25J 15/0052* (2013.01); *B25J 15/0616* (2013.01); *B32B 37/0046* (2013.01); *B32B 37/06* (2013.01); *B32B 37/12* (2013.01); *B32B 37/142* (2013.01); *B32B 37/18* (2013.01); *B32B 37/22* (2013.01); *B32B 38/0004* (2013.01); *B32B 38/0008* (2013.01); *F02C 7/045* (2013.01); *G10K 11/172* (2013.01); *B32B 2307/102* (2013.01); *B32B 2605/18* (2013.01); *Y02T 50/672* (2013.01); *Y10T 29/49572* (2015.01);
(Continued)

(58) Field of Classification Search
None
See application file for complete search history.

(56) References Cited

U.S. PATENT DOCUMENTS 3,700,067 A 10/1972 Dobbs et al.
3,831,710 A 8/1974 Wirt
(Continued)

FOREIGN PATENT DOCUMENTS

GB 2056367 A 6/1980
GB 2122540 A 5/1983
(Continued)

OTHER PUBLICATIONS

Liu et al., "A multiple degree of freedom electromechanical Helmholtz resonator," Acoustic Society of America, vol. 122, No. 1, Jul. 2007, pp. 291-301.
(Continued)

*Primary Examiner* — Barbara J Musser
(74) *Attorney, Agent, or Firm* — Yee & Associates, P.C.

(57) ABSTRACT

A laser cuts overlapping ribbons of acoustic material into acoustic devices. An automatically controlled manipulator includes an end effector having groups of placement tools for simultaneously placing multiple acoustic devices in a cellular core. The placement tools include mandrels provided with vacuum pickups for picking up and holding the acoustic devices during transport to the core. A vision system aligns the placement tools with the cells of the core. The end effector includes a thermal radiation device for bonding the acoustic devices to the core.

23 Claims, 16 Drawing Sheets

(51) Int. Cl.
*H04R 31/00* (2006.01)
*B32B 37/22* (2006.01)
*B32B 37/18* (2006.01)
*B32B 37/14* (2006.01)
*B32B 37/12* (2006.01)
*B32B 37/00* (2006.01)
*B32B 38/00* (2006.01)
*B32B 37/06* (2006.01)
*B25J 15/00* (2006.01)
*G10K 11/172* (2006.01)

(52) U.S. Cl.
CPC .... *Y10T 29/53078* (2015.01); *Y10T 29/53478* (2015.01); *Y10T 29/53657* (2015.01); *Y10T 156/1002* (2015.01); *Y10T 156/1062* (2015.01); *Y10T 156/12* (2015.01)

(56) References Cited

U.S. PATENT DOCUMENTS

| | | | |
|---|---|---|---|
| 4,235,303 A | 11/1980 | Dhoore et al. | |
| 4,248,647 A | 2/1981 | Herron et al. | |
| 4,257,998 A | 3/1981 | Diepenbrock, Jr. et al. | |
| 4,265,955 A | 5/1981 | Harp et al. | |
| 4,384,020 A | 5/1983 | Beggs et al. | |
| 4,452,335 A | 6/1984 | Mathews et al. | |
| 4,465,725 A | 8/1984 | Riel | |
| 4,594,120 A | 6/1986 | Bourland, Jr. et al. | |
| 4,671,841 A | 6/1987 | Stephens | |
| 5,041,323 A | 8/1991 | Rose et al. | |
| 5,175,401 A | 12/1992 | Arcas et al. | |
| 5,471,738 A * | 12/1995 | Burcham | B23P 11/025 29/701 |
| 5,543,198 A | 8/1996 | Wilson | |
| 6,114,652 A | 9/2000 | Clarke et al. | |
| 6,182,787 B1 | 2/2001 | Kraft et al. | |
| 6,509,081 B1 | 1/2003 | Diamond | |
| 6,607,625 B2 | 8/2003 | Andre et al. | |
| 6,767,606 B2 | 7/2004 | Jackson et al. | |
| 6,840,349 B2 | 1/2005 | Andre et al. | |
| 7,328,771 B2 | 2/2008 | Costa et al. | |
| 7,434,659 B2 | 10/2008 | Ayle | |
| 7,510,052 B2 | 3/2009 | Ayle | |
| 7,588,212 B2 | 9/2009 | Moe et al. | |
| 7,854,298 B2 | 12/2010 | Ayle | |
| 7,913,813 B1 | 3/2011 | Mathur | |
| 7,921,966 B2 | 4/2011 | Chiou et al. | |
| 8,037,967 B2 | 10/2011 | Mercat | |
| 8,066,098 B2 | 11/2011 | Ayle | |
| 8,413,761 B2 | 4/2013 | Ayle | |
| 8,511,429 B1 | 8/2013 | Yu et al. | |
| 2005/0178489 A1 | 8/2005 | Belleguic et al. | |
| 2006/0219477 A1 | 10/2006 | Ayle | |
| 2008/0020176 A1 * | 1/2008 | Ayle | F02C 7/045 428/118 |
| 2010/0001439 A1 * | 1/2010 | Bock | B25J 15/0023 264/528 |
| 2013/0075193 A1 | 3/2013 | Vavalle | |
| 2014/0277711 A1 * | 9/2014 | Tomo | B25J 15/0616 700/245 |

FOREIGN PATENT DOCUMENTS

| | | |
|---|---|---|
| JP | 2002271098 A | 9/2002 |
| JP | 2007007768 A | 1/2007 |
| WO | WO2015026421 A2 | 2/2015 |

OTHER PUBLICATIONS

Han, "Sound Reduction by a Helmholtz Resonator," Masters Thesis, Lehigh University, Sep. 2008, 110 pages.
"Hexweb Acousti-Cap," Hexcel Corporation, copyright 2010, 4 pages, accessed Jul. 29, 2013. http://www.hexcel.com/Resources/DataSheets/Brochure-Data-Sheets/HexWeb_Acousti-Cap.pdf.
"Purolator Acoustic Porous Metals," Purolator Advanced Filtration, copyright 2006, 3 pages, accessed Jul. 29, 2013. http://www.purolator-facet.com/Markets/Aerospace-Filtration/Acoustic-Media.
Herrera et al., "Acoustic Panel," U.S. Appl. No. 13/953,287, filed Jul. 29, 2013, 29 pages.
Butler et al., "Composite Laminates Having Hole Patterns Produced by Controlled Fiber Placement," U.S. Appl. No. 13/953,392, filed Jul. 29, 2013, 37 pages.
Butler et al., "Setpumization of Honeycomb Sandwiches," U.S. Appl. No. 13/953,456, filed Jul. 29, 2013, 28 pages.
Gerken et al., "Septumization of Cellular Cores," U.S. Appl. No. 14/326,890, filed Jul. 9, 2014, 30 pages.
Extended European Search Report, dated Nov. 13, 2015, regarding Application No. EP15170503.5, 6 pages.

* cited by examiner

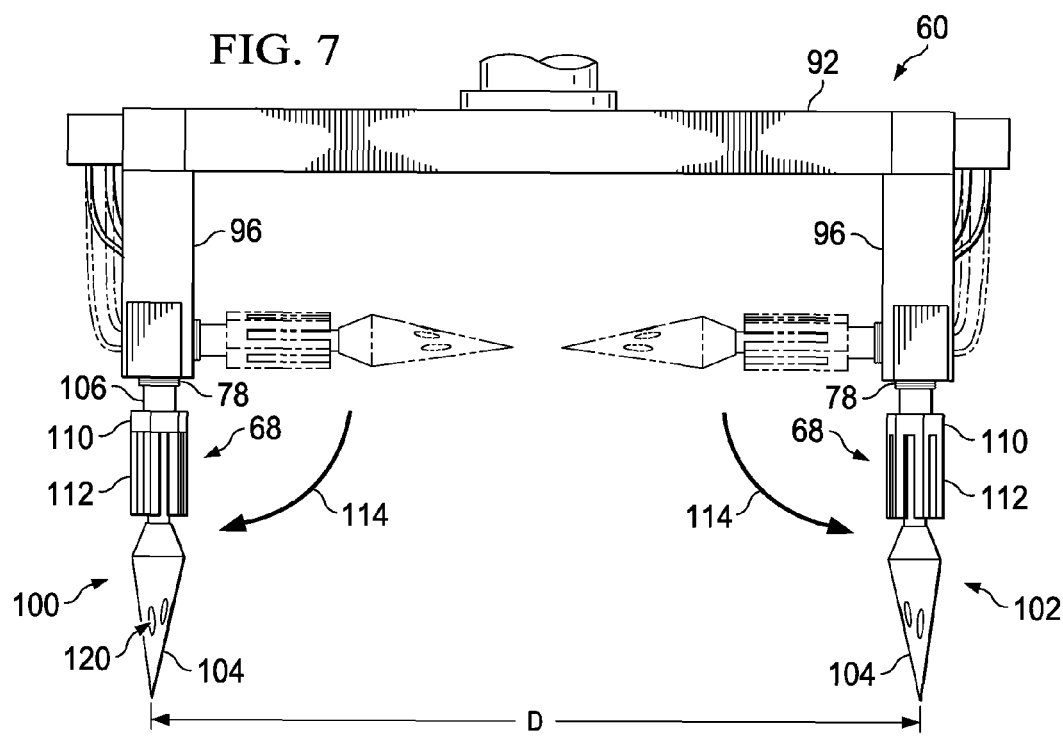
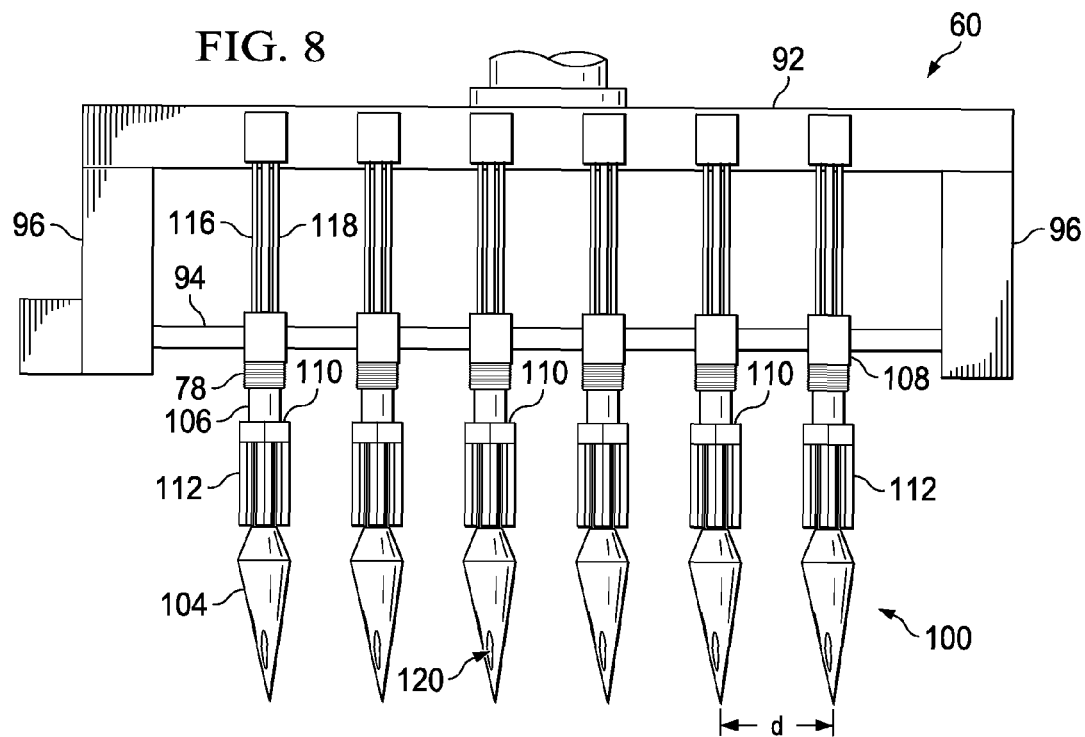

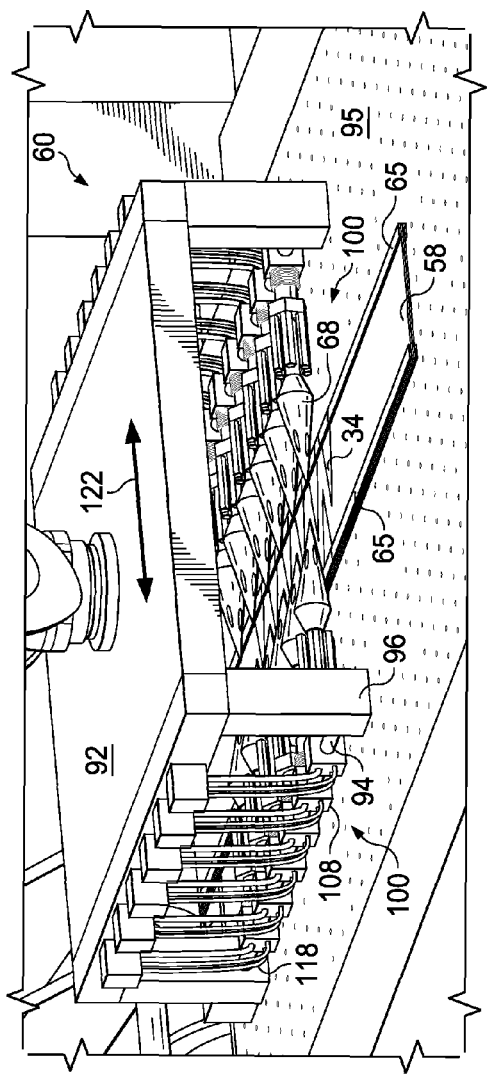
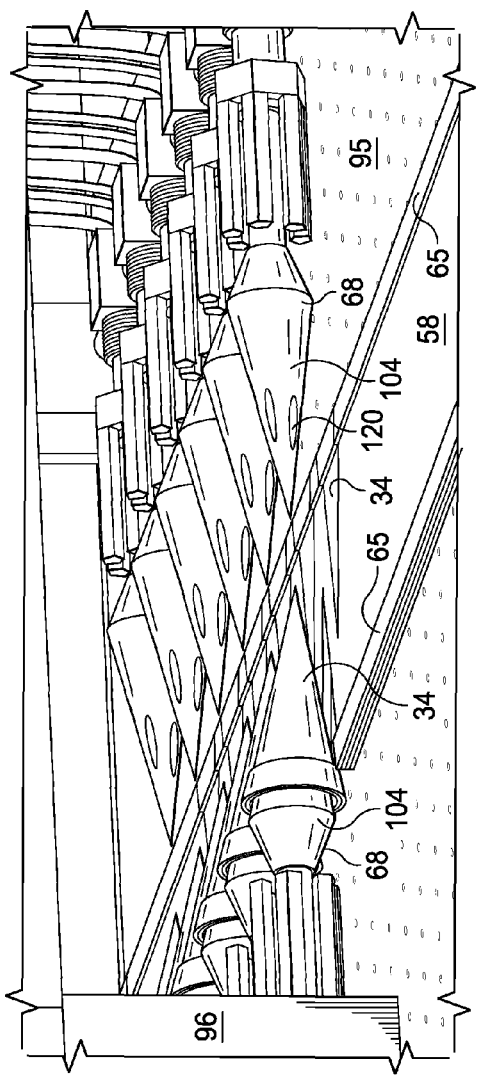
FIG. 9
FIG. 10

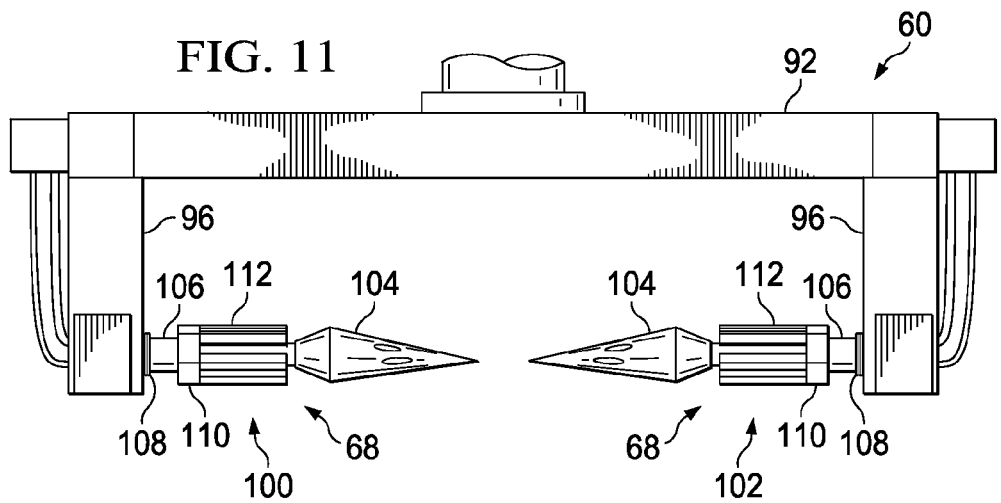
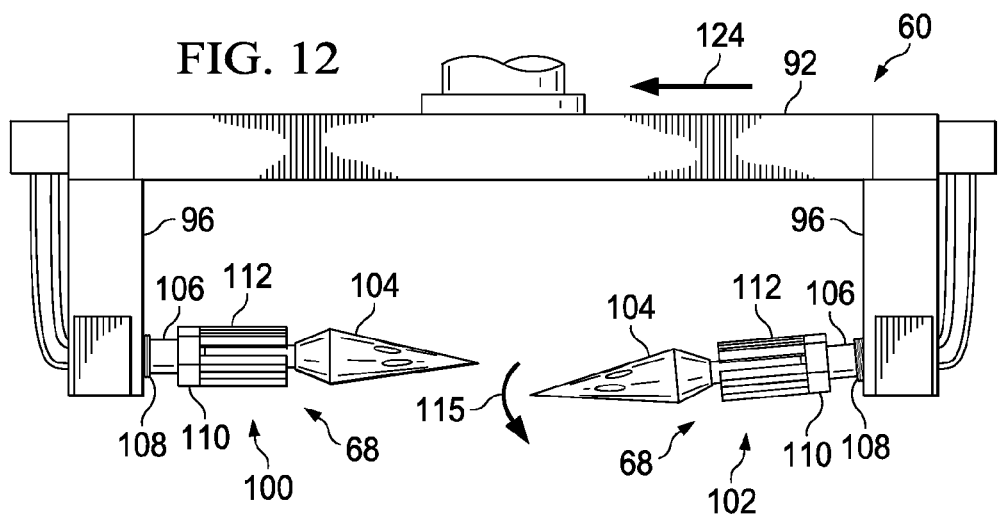
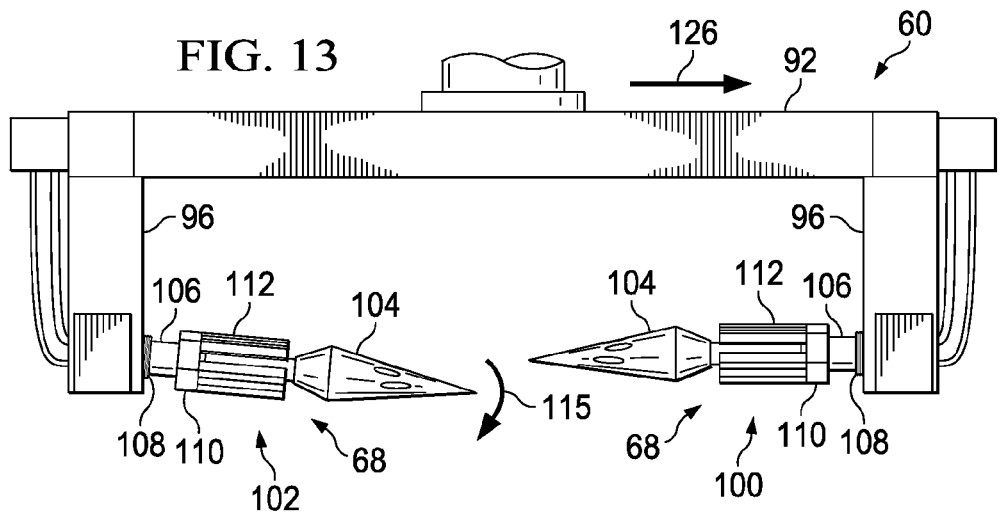

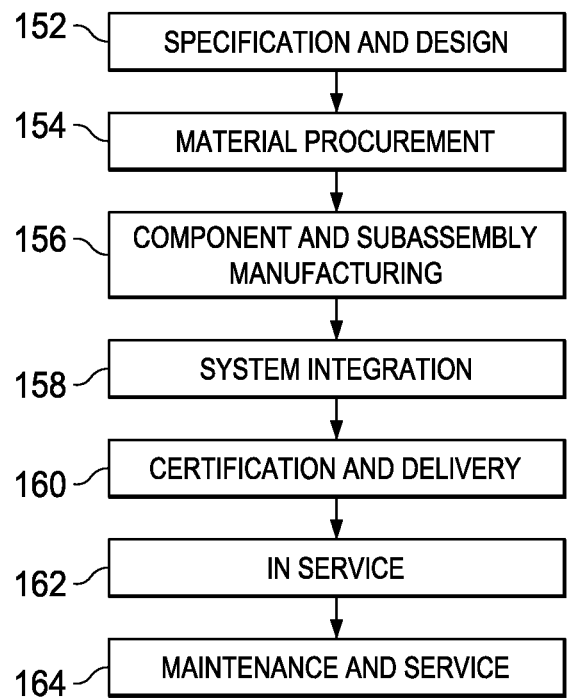
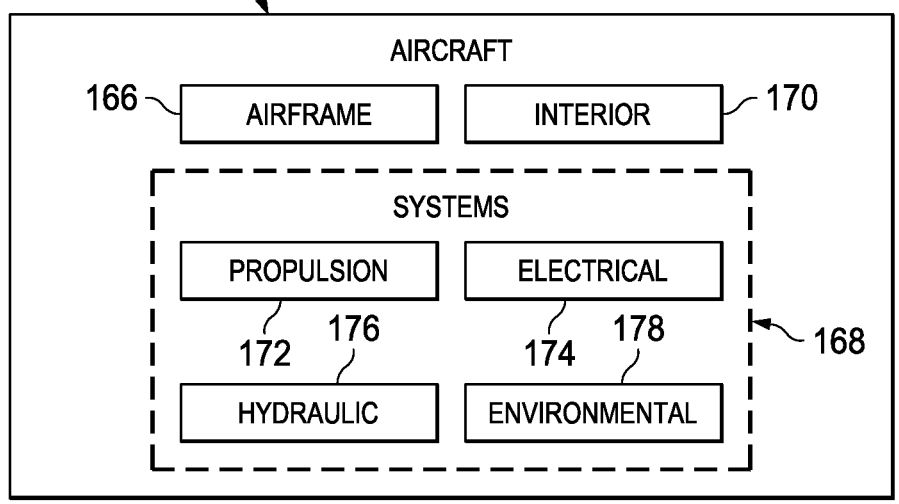

AUTOMATED PRODUCTION OF ACOUSTIC STRUCTURES

BACKGROUND INFORMATION

1. Field

The present disclosure generally relates to acoustic structures, and deals more particularly with a method and apparatus for installing acoustic devices in cellular cores.

2. Background

Acoustic structures are used in a wide variety of applications to attenuate noise. For example, one type of an acoustic structure used to reduce noise in aircraft engines aircraft engines is an acoustic liner comprising a panel construction in which a cellular core is sandwiched between a perforated inner skin and a non-perforated outer skin. The cellular core may have a septum in each of the cells in order to increase the acoustic performance of the liner.

There are at least three known methods for septumization of honeycomb cores, each of which is time consuming and labor intensive, in part because each septum must be individually placed in a cell of the core. The first method requires splitting the core and using an adhesive to bond a septum layer between the split cores. The second method involves a lost wax process which creates a buried septum, where a honeycomb core is pressed into wax. A thin layer of liquid resin floats on top of the wax which is then cured to form a solid layer and the wax is melted out of the honeycomb core. The third method involves using an automated robotic process where individual septum pieces with tabs are inserted one-by-one into each honeycomb cell. The tabs of the individual septum pieces are bonded to the honeycomb cell walls by carefully dipping the honeycomb panel to a certain depth into a liquid adhesive.

Accordingly, there is a need for a method and apparatus for placing acoustic devices such as septums in a cellular core that is both rapid and cost-effective. There is also a need for a method of producing acoustic structures that is more highly automated and efficient than has been heretofore possible.

SUMMARY

The disclosed embodiments provide a fully automated method and apparatus for production of acoustic structures such as septumized cores used for sound control. The acoustic structures are produced using a computer-controlled laser to cut acoustic material to a desired acoustic device shape and perimeter weld the material. Large numbers of acoustic devices such as septums, may be rapidly inserted into the cells of a cellular core and bonded in place under full automatic control. A machine vision system and digital controls assure accurate alignment and precise placement of the acoustic devices in the core.

According to one disclosed embodiment, apparatus is provided for producing an acoustic structure having a core with a plurality of cells. An end effector is mounted on the manipulator, and includes a plurality of acoustic device placement tools each capable of placing an acoustic device in one of the cells of the core. A digital controller includes a set of digital instructions for controlling movement of the manipulator and operation of the end effector. The acoustic device placement tools are arranged in first and second opposing banks thereof. Each of the acoustic device placement tools is mounted on the end effector for pivotal movement between an acoustic device pick-up position an acoustic device placement position. Each of the acoustic device placement tools includes a mandrel capable of being inserted into the acoustic device, and a vacuum pickup for holding an acoustic device on the mandrel. Each of the acoustic device placement tools further includes a plurality of fingers shiftable into an end of the acoustic device for shaping the end of the acoustic device to match the cells. The apparatus further comprises a vision system for guiding the end effector and aligning each of the acoustic device placement tools with one of the cells of the core. The vision system includes a laser mounted on the end effector for directing a laser spot onto the core, and a camera mounted on the end effector for viewing the cells of the core. The apparatus also includes a material supply system for supplying overlapping ribbons of acoustic material and ribbons of adhesive material that overlap and adhere to the ribbons of acoustic material. A laser coupled with the digital controller cuts the acoustic ribbons into a shape of the acoustic devices. A curing device coupled with each of the acoustic device placement tools cures the adhesive ribbons. The curing device may comprise a thermal radiation generator capable of directing thermal radiation onto the adhesive ribbon.

According to another disclosed embodiment, apparatus is provided for automated production of an acoustic core having a plurality of cells. The apparatus comprises a material supply system for supplying ribbons of acoustic material, and a laser for converting the ribbons into a plurality of acoustic devices. The apparatus further includes an end effector for picking up the acoustic devices and placing the acoustic devices in the cells, and a controller coupled with the laser and the end effector. The material supply system includes two spools of acoustic ribbons capable of being drawn away from spools in overlapping relationship to each other. The material supply system further includes two spools of adhesive ribbons capable of being drawn away from the spools in laterally spaced relationship to each other and overlapping the ribbons of acoustic material. The controller is capable of controlling operation of the laser and includes a set of programmed instructions that direct the laser to cut out the acoustic devices from the ribbons of acoustic material. The end effector includes a plurality of acoustic device placement tools each capable of placing an acoustic device in one of the cells of the core. Each of the acoustic device placement tools includes a mandrel insertable into one of the acoustic devices, and a vacuum system coupled with the mandrel and capable of generating a vacuum within the acoustic device for holding the acoustic device on the mandrel. Each of the acoustic device placement tools may include a shaper that is shiftable into an end of the acoustic device for shaping the end of the acoustic device to match the wall geometry of the cells. The apparatus further comprises a vision system coupled with the controller for aligning the acoustic device placement tools with each of the cells of the core.

According to another disclosed embodiment, apparatus is provided for installing a generally hollow acoustic device in a cell of a cellular core. The Apparatus includes a tool capable of being inserted into the acoustic device, and a vacuum pickup on the tool capable of holding the acoustic device against the tool. A shaper on the tool is operative for shaping an end of the acoustic device to substantially match the geometry of the cell. The tool is elongate and tapered along its length, and the shaper includes fingers that are slidable over the tool and into the acoustic device. The fingers are circumferentially spaced apart from each other around the tool. Each of the fingers has an outer tip shaped to form an end of the acoustic device to substantially match the shape of the cell. The apparatus further comprises a radiation generator coupled with the tool and capable of directing radiation toward the acoustic device during installation of the acoustic device in the cell.

According to a further disclosed embodiment, apparatus is provided for fabricating a plurality of acoustic devices adapted to be installed in a cellular core. The apparatus includes a supply of adhesive for bonding each of the acoustic devices to the core, as well as a supply of acoustic material sheets. Apparatus also includes a cutter for cutting the acoustic material sheets into a desired shape, and a joiner for joining the acoustic material sheets together. The supply of adhesive includes a at least one ribbon of adhesive material capable of being drawn onto the acoustic material sheets. The supply of acoustic material sheets includes first and second ribbons of acoustic material aligned to be drawn to into overlapping relationship with each other. The cutter and the joiner may comprise an automatically controlled laser.

According to still another disclosed embodiment, a method is provided of producing an acoustic core having a plurality of cells. The method comprises fabricating a plurality of acoustic devices, picking up groups of the acoustic devices, placing the groups of the acoustic devices respectively in cells of the core, and bonding the acoustic devices to the core. Fabricating the acoustic devices is performed by overlaying ribbons of acoustic material, and laser cutting the ribbons in a shape of the acoustic devices and welding together edges of the ribbon surrounding at least a portion of each of the acoustic devices. Picking up groups of the acoustic devices includes inserting a plurality mandrels respectively into the acoustic devices, and holding the acoustic devices on the mandrels using a suction force. Placing the groups of the acoustic devices respectively into cells of the core is performed by using a vision system to align the acoustic devices with the cells. Bonding the acoustic devices to the core includes directing thermal radiation onto the acoustic devices after the acoustic devices have been placed in the core.

According to a further disclosed embodiment, a method is provided of installing a generally hollow acoustic device in a cell of a cellular core. A tool is inserted into the acoustic device, and a vacuum is used to hold the acoustic device on the tool. A shaping process is used to shape an end of the acoustic device to match a shape of the cell. The method further includes picking up the acoustic device using the tool, and placing the acoustic device in a cell using the tool. The shaping process may be performed by inserting a plurality of fingers into the end of the acoustic device. Insertion of the tool is performed using a tip of the tool to spread apart the end of the acoustic device into which the tool may be inserted. The fingers are inserted into the acoustic device after the tool has been inserted into the acoustic device. The method may further comprise applying an adhesive to the acoustic device, and bonding the acoustic device to the cell. The adhesive is cured by directing radiation from the tool onto the adhesive.

According to still another disclosed embodiment, a method is provided of fabricating a plurality of acoustic devices adapted to be placed in a cellular core. Ribbons of acoustic material are overlapped and cut into a plurality of individual pieces, each having a profile of one of the acoustic devices. The individual pieces are then joined along their edges. The ribbons may be cut and join together using a laser. The method may further comprise placing at least one ribbon of adhesive on the overlapping ribbons of acoustic material. The laser may be used to cut the ribbons of adhesive.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 7 is an illustration of an end elevational is view of the end effector, wherein the folded position of the placement tools is indicated in broken lines.

FIG. 8 is an illustration of a side elevational view of the end effector shown in FIG. 7.

FIG. 9 is an illustration of a perspective view of the end effector positioned to pick up a group of the individual septums.

FIG. 10 is an illustration of an enlarged perspective view showing the placement tools in the process of picking up the septums.

FIG. 11 is an illustration of an end elevational view of the end effector, showing the placement tools in the fully folded position.

FIG. 12 is an illustration similar to FIG. 11 but showing one bank of the placement tools having partially rotated in preparation for picking up one set of the septums.

FIG. 13 is an illustration similar to FIG. 11, but showing the other bank of the placement tools having been partially rotated in preparation for picking up the other set of septums.

FIG. 25 is an illustration of a flow diagram of aircraft production and service methodology.

FIG. 26 is an illustration of a block diagram of an aircraft.

DETAILED DESCRIPTION

Figure 1:
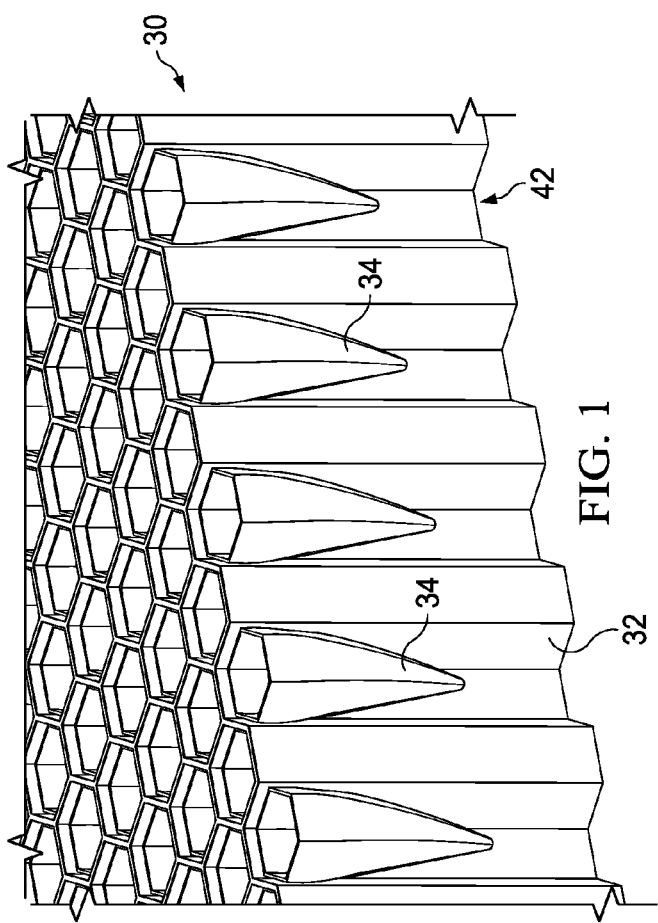
FIG. 1 is an illustration of a perspective view of a septumized cellular core, portions of the cell walls being broken away to reveal individual septums.

The disclosed embodiments relate to a method and apparatus for automated production of acoustic structures such as a cellular acoustic core containing large quantities of acoustic devices. For example, referring to FIG. 1, an acoustic structure 30 has a cellular acoustic core 32, sometimes referred to herein as a honeycomb core, containing a multiplicity of individual cells 42. Each of the cells 42 contains a generally hollow acoustic device 34 for altering the acoustic characteristics of the cellular core 32, such as sound attenuation. In the illustrated example, the acoustic device 34 comprises a discrete, cone shaped septum 34 that is bonded to the cellular core 32, however other types of acoustic devices 34 may be installed in the cellular core 32 using the method and apparatus described below.

Figure 2:
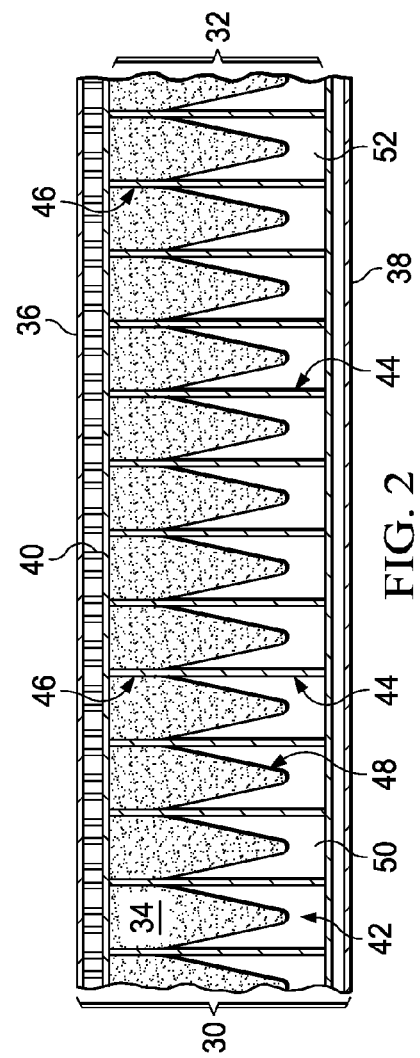
FIG. 2 is an illustration of a cross-sectional view of a portion of the acoustic liner.

Referring now to FIG. 2, the disclosed method and apparatus may be used, for example and without limitation, to septumize a cellular core 32 of an acoustic structure 30 employed as an acoustic liner 30. The acoustic liner 30 may be used in various parts of a jet engine to attenuate noise. The acoustic liner 30 is a sandwich panel construction broadly comprising a honeycomb core 32 sandwiched between inner and outer facesheets 36, 38 respectively. The inner facesheet 36 includes a multiplicity of perforations 40 therein which allow sound waves, including noise to pass through the inner facesheet 36 into the cellular core 32. The inner facesheet 36 is attached to the top of the cellular core 32 by any suitable process such as adhesive bonding. Similarly, the outer facesheet 38 may be attached to the bottom the cellular core 32 by adhesive bonding.

In the illustrated embodiment, the inner and outer facesheets 36, 38 each may comprise a composite laminate such as a CFRP (carbon fiber reinforced plastic) however, either of these facesheets may comprise other materials. The honeycomb core 32 is formed of a multiplicity of individual polygonal cells 42 which are defined by a number of cell walls 44. In the illustrated example, the cells 42 are hexagonal, however other cell geometries are possible. The honeycomb core 32 is septumized by a plurality of individual composite septums 34 which are precisely placed in, and bonded to the core 32 using the method and apparatus described below. The septums 34 are perforated or may be formed from a porous material such as a mesh which allows a portion of the sound waves to pass through the septums 34, downwardly through the cells 42 toward the outer facesheet 38.

The individual septums 34, which may be collectively referred to as septa 34, have an upper section 46 and a lower section 48. The upper section 46 of the septa 34 have substantially the same cross-sectional shaped as the cells 42 (hexagonal in the illustrated embodiment) and are adhesively bonded to the cell walls 44, thereby fixing the position of the septa 34 within the cells 42. In the illustrated embodiment, the cell walls 44 and the septa 34 may be formed of a composite fabric (woven or knitted) such as a PEEK thermoplastic, however other materials are possible.

The lower section 48 of the generally hollow septa 34 extends down into the cells 42 a desired depth, forming cavities 50 within the cells 42 of a preselected the volume, shape and surface area which achieve a desired acoustic performance for a chosen application. For example, the size, shape and surface area of the septa 34 may be selected to form resonant cavities 50 that assist in canceling or damping sound waves/noise flowing over the acoustic structure 30 which enter cellular core 32 through the perforations 40 in the inner facesheet 36.

In the illustrated embodiment, the lower section 48 of the septa 34 is generally conical in shape, however the septa 34 may have other shapes which may be constant or varying over the area of the cellular core 32, allowing the acoustic structure 30 to be tuned in different areas to attenuate different types of noise, such as noises in different frequency ranges. Also, while the upper sections 46 of the septa 34 are positioned at the top of the cells 42 in the illustrated embodiment, in other embodiments the septa 34 may be positioned lower within the cells 42 such that the upper sections 46 are spaced below the top of the cells 42. As previously pointed out, the septa 34 are merely illustrative of a wide range of acoustic device 34 that can be installed in the cellular core 32 according to the disclosed method.

Figure 3:
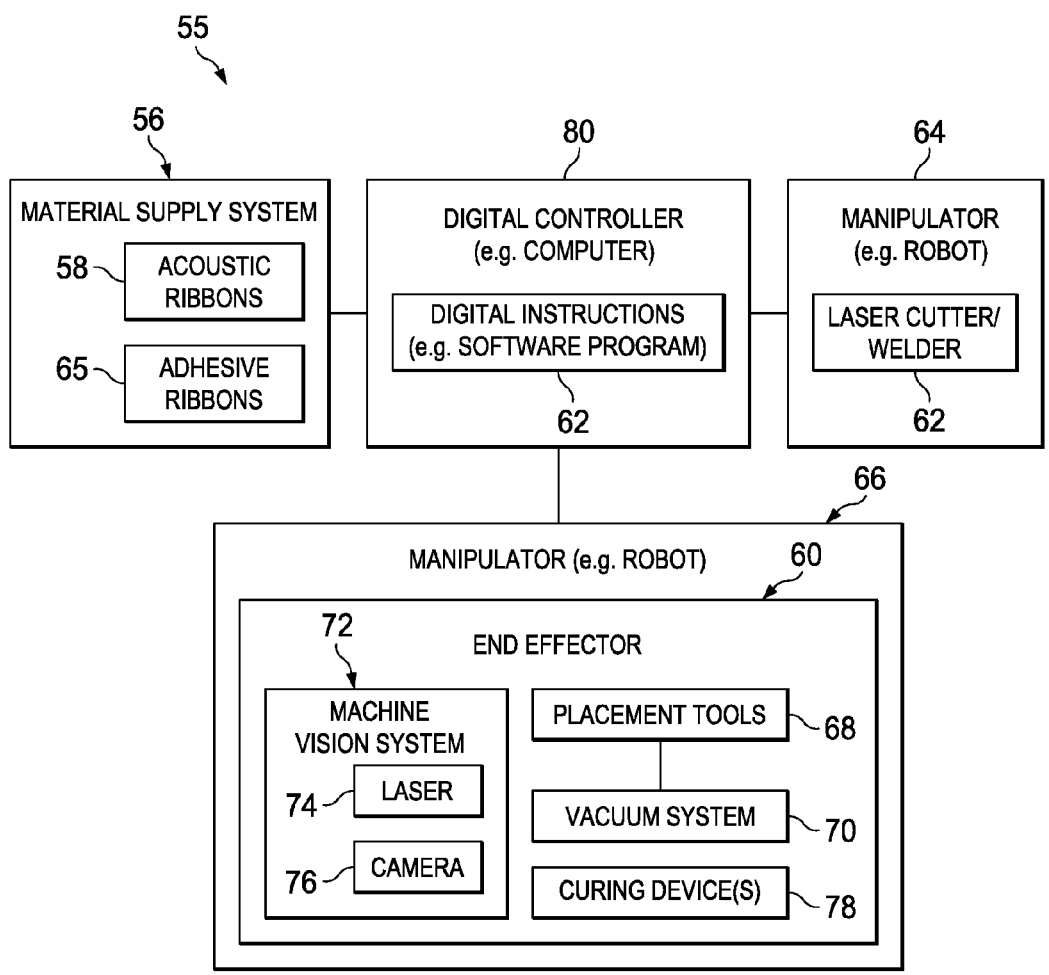
FIG. 3 is an illustration of a block diagram of a system for producing acoustic structures.

Attention is now directed to FIG. 3 which broadly illustrates the functional components of apparatus 55 for automated production of acoustic structures 30 having a multiplicity of individual cells 42 containing generally hollow acoustic devices 34 such as septa. The apparatus 55 comprises a material supply system 56, automatically controlled laser cutter/welder 62, an end effector 60, and a digital controller 80. The material supply system 56 provides a supply of acoustic material sheets in the form of ribbons of acoustic material 58, and a supply of adhesive in the form of ribbons of adhesive material 65. The acoustic ribbons 58 are cut into the desired shape of individual acoustic devices 34 by the laser cutter/welder 62. The adhesive ribbons 65 (hereafter sometimes referred to as "adhesive") are applied to the individual septums 34 for use in bonding the acoustic devices 34 within the individual cells 42 of the cellular core 32. While the bonding adhesive 65 is shown as ribbons in the illustrated embodiment, in other embodiments the adhesive 65 may be in other forms such a paste adhesive, a liquid adhesive or strips of an adhesive that are applied to the acoustic devices 34 using any of a variety of techniques. The laser cutter/welder 62 is mounted on a manipulator 64 which may comprise a robot (not shown), gantry (not shown) or similar machine that is digitally controlled by the controller 80 and is capable of moving the laser cutter/welder 62 on a desired programmed path. As will be discussed below, the laser cutter/welder 62 acts both as a cutter that cuts sheets of the acoustic material into desired shapes, and as a joiner that joins edges of the sheets after they have been cut to the desired profile shape.

The end effector 60 is mounted on a manipulator 66 which may be the same or different than the manipulator 64 used to control the laser cutter/welder 62. In the illustrated example, as will be discussed below, the manipulator 66 comprises a robot having multiple degrees of freedom and capable of moving the end effector 60 along multiple axes, under control of the digital controller 80. The digital controller 80 may comprise, for example and without limitation, a PC (personal computer), a general-purpose program computer or a PLC (programmable logic controller). The digital controller 80 may include, or have access to a set of digital programmed instructions 82 in the form of one or more software programs.

The end effector 60 includes a machine vision system 72, a plurality of acoustic device placement tools 68, a vacuum system 70 and one or more curing devices 78 which may comprise a radiation generator. Each of the acoustic device placement tools 68 is coupled with the vacuum system 70 which functions to hold the acoustic device 34 until it has been placed and bonded within a cell 42. The machine vision system 72 may include a laser 74 for directing a laser spot (not shown) onto the cellular core 32, and a camera system 76 for viewing the core 32, and detecting the laser spot as well as other details of the cellular core 32 required for aligning and accurately placing the acoustic devices 34 in the core cells 42. Each of the curing devices 78 is operative to generate radiation that cures the adhesive 65 during the installation process in order to bond the acoustic device 34 to the cell walls 44 (FIG. 2) of the cell 42 in which it has been installed. The radiation generated by the curing device 78 may be thermal (e.g. infrared), UV (ultraviolet) or other wavelengths suitable for curing the particular adhesive 65 that is chosen for the application.

Figure 4:
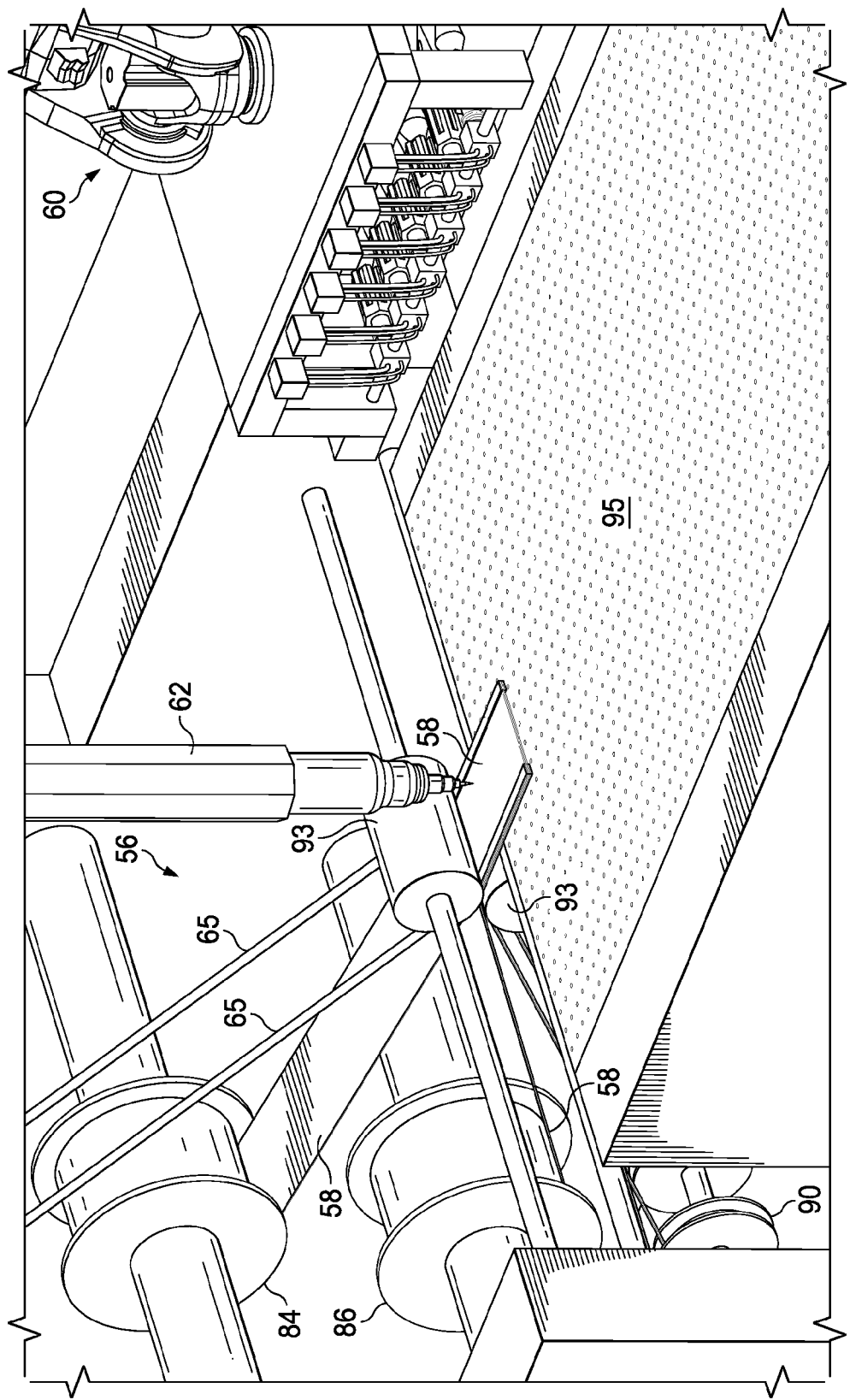
FIG. 4 is an illustration of a perspective view showing acoustic and adhesive ribbons the drawn onto a cutting table.
Figure 5:
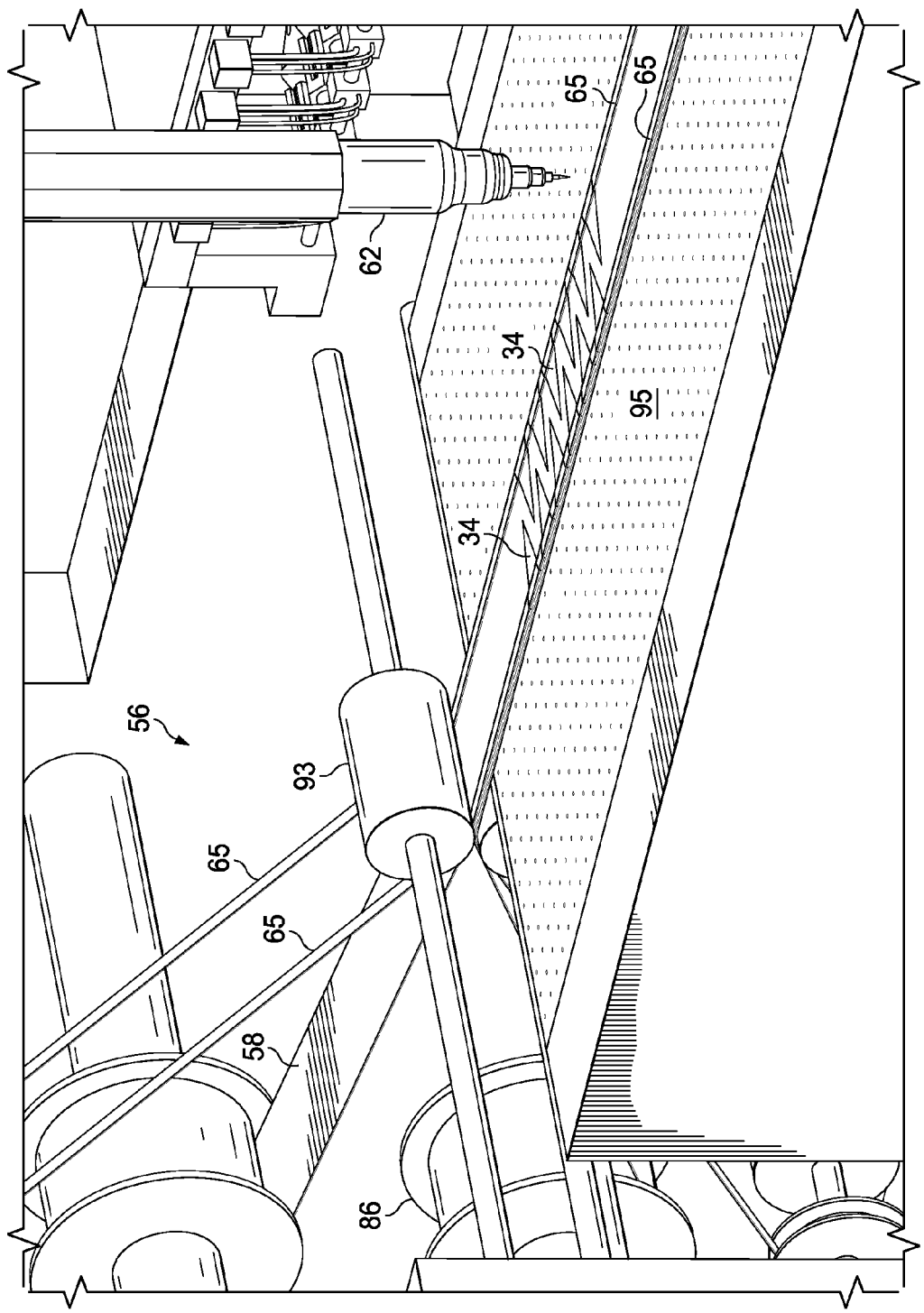
FIG. 5 is an illustration similar to FIG. 4, but showing ribbons having been drawn down on the cutting table and a laser having cut the ribbons into a group of individual septums.

Attention is now directed to FIGS. 4 and 5 which illustrate additional details of the material supply system 56, and a process for producing acoustic devices 34 using the laser cutter/welder 62. The material supply system 56 broadly comprises two spools 84, 86 of acoustic ribbons 58, and two spools 90 of adhesive 65. Ribbons of the acoustic material 58 are drawn from the spools 84, 86 and brought into overlapping relationship, forming a double layer of acoustic material, before being drawn through a pair of pinch rollers 93 onto a flat table 95. The table 95 may be a perforated air table coupled with a vacuum which draws the double layers of acoustic material tightly down onto the table 95 in order to eliminate wrinkling and hold the double layers flat during subsequent processing.

The adhesive 65, which may be in ribbon or other forms, is drawn off the spools 90 in laterally spaced relationship and is aligned with the outer edges of the acoustic material ribbons 58, before being drawn through the pinch rollers 93 onto the outer edges of the double layers of acoustic material ribbons 58. The laser cutter/welder 62, operated by the digital controller 80 (FIG. 3), cuts the double layers of acoustic material into stacked, individual pieces having the shape of the acoustic devices 34, arranged in alternating, mirror image patterns. The ribbon of adhesive 65 may be cut by the laser cutter/welder 62 along with the ribbon 58 of acoustic material. As the laser cutting is being performed, the heat produced by the laser cutter/welder 62 welds and joins the cut edges of the two layers together. While a laser cutter/welder 62 has been disclosed, other techniques for cutting the ribbons 58 of acoustic material and the adhesive 65 into the shape of the septums 34, and then sealing the cut edges may be employed. Moreover, as previously mentioned, the adhesive 65 may be in forms other than ribbons, and may be applied to the acoustic devices 34 using any of a variety of other techniques.

Figure 6:
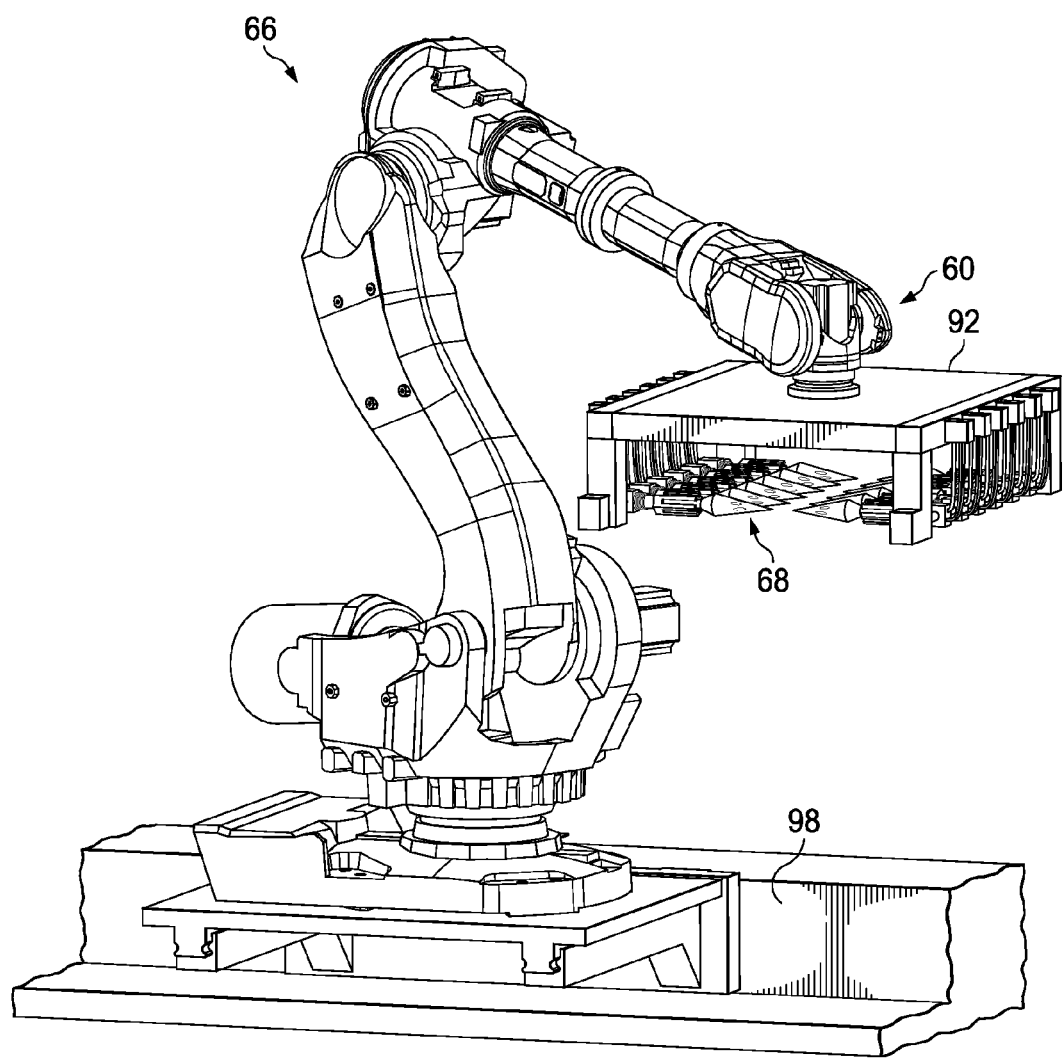
FIG. 6 is an illustration of a perspective view of an end effector mounted on a robot.
Figure 14:
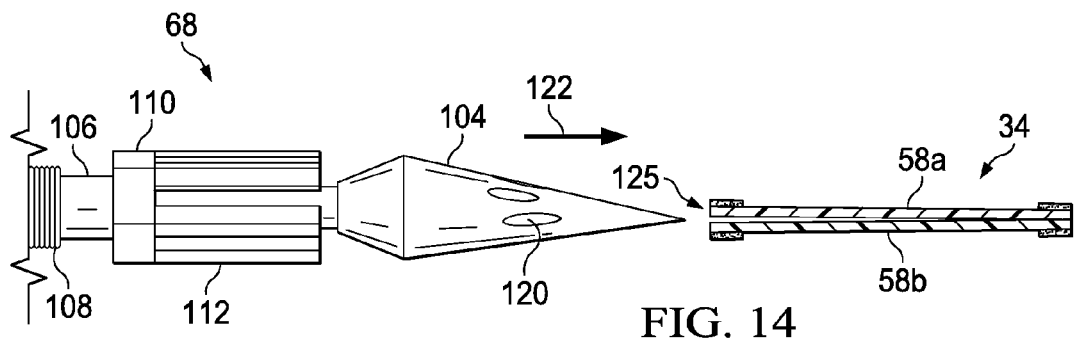
FIG. 14 is an illustration of a side elevational view showing one of the placement tools about to pick up one of the septums.

Referring now to FIGS. 6, 7 and 8, the end effector 60 comprises a frame 92 mounted on an arm of a robot 66 that is movable along a track 98. The end effector 60 includes a plurality of placement tools 68 which pick up the generally hollow acoustic devices 34 from the table 95 (FIGS. 4 and 5) and transport them to a later described cellular core where the placement tools 68 are used to place and bond the acoustic devices 34 in the core cells 42.

As best seen in FIG. 7, the placement tools 68 are arranged in two opposing banks 100, 102, each comprising a plurality of the placement tools 68 which are aligned and spaced apart from each other distances "d" corresponding to the spacing between the core cells 42. Similarly, the banks 100, 102 are spaced apart from each other a distance "D" corresponding to a predetermined multiple of the spacing between the core cells 42. The placement tools 68 in each of the banks 100, 102 are pivotally mounted on a shaft 94 fastened at its opposite ends to hangers 96 secured to and extend downwardly from the frame 92.

Each of the placement tools 68 comprises a conically shaped, foot-like mandrel 104 having vacuum pickups 120 that are connected to the vacuum system 70 (FIG. 3). A spindle 106 connects each of the mandrels 104 with a mounting block 108 which, in turn, is pivotally mounted on one of the shafts 94, thereby mounting the placement tools 68 for pivotal movement 114 between an acoustic device pick-up position (broken lines in FIG. 7), and an acoustic device placement position.

A shaper 110 is sleeved over and linearly displaceable along each of the spindles 106. Each of the shapers 110 includes a plurality of circumferentially spaced apart shaping fingers 112 having outer tips that are configured to substantially match the geometry of the cell walls 44 (FIG. 2) of the core 32. The shapers 110 are pneumatically actuated through pneumatic lines 116, while the vacuum pickups 120 are coupled with the vacuum system 70 by vacuum lines 118 to produce a suction force that holds the acoustic devices on the mandrels 104.

It should be noted here that the placement tools 68 described above are merely illustrative of tools that may be mounted on the end effector 60 and used to "pick and place" the acoustic devices 34 in the core cells 42. The exact configuration and features of the placement tools 68 may vary depending on the application, the size and shape of the acoustic devices 34 and the geometry of the core cells 42. Moreover, the number of the placement tools 68 that are mounted on the end effector 60 may vary with the application. In some applications, a single one of the placement tools 68 may be satisfactory and effective in placing acoustic devices 34 in core cells 42.

Attention is now directed to FIGS. 9-16 which illustrate the operation of the end effector 60 during pickup of the acoustic devices 34 from the table 95. The pickup sequence involves lateral shifting 122 (FIG. 9) of the end effector 60, back-and-forth across the ribbon of acoustic material 58 that has been cut into individual acoustic devices 34. With the two banks 100, 102 of placement tools 68 in their folded position shown in FIG. 11, the end effector 60 is lowered to a position that is slightly above the surface of the table 95, as best seen in FIG. 9.

Next, as shown in FIGS. 9 and 12, one of the banks 102 is partially pivoted 115 downwardly (see FIG. 12) to align the end of the mandrels 104 with the open ends 125 (FIG.

Figure 15:
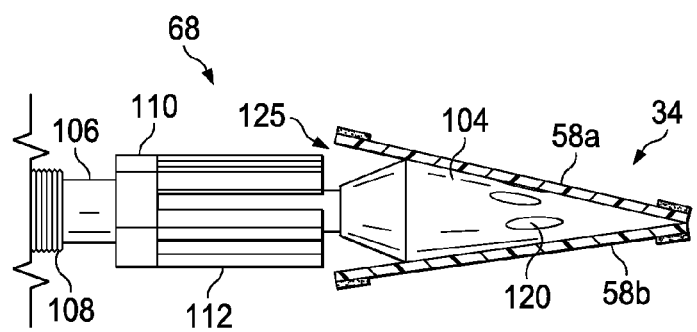
FIG. 15 is an illustration similar to FIG. 14 but showing the placement tool having spread and entered the septum.

14) of the acoustic devices 34 of one bank 102 thereof, which at this stage, are in a collapsed, flat state. Next, the end effector 60 is laterally shifted 122 (FIG. 9), causing the mandrel 104 to enter the open end 125, and then spread apart the acoustic device 34, as shown in FIGS. 10 and 15. The vacuum pickup 120 is then actuated, causing the hollow acoustic device 34 to be sucked toward and drawn against the mandrel 104, thereby holding the acoustic device 34 against the tool 68.

Figure 16:
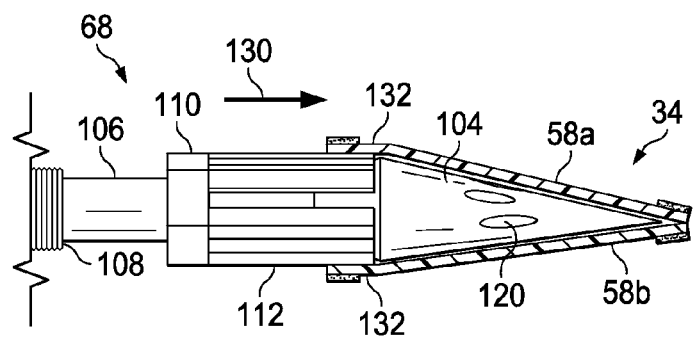
FIG. 16 is an illustration similar to FIG. 15 but showing forming fingers on the placement tool having shifted into and formed the open end of the septum.

Next, as shown in FIG. 16, the shaper 109 is shifted 130 into the open end 125 of the acoustic device 34, causing the fingers 112 to shape the periphery 132 of acoustic device 34 to substantially match the cross-sectional shape of the core cells 42 which, in the illustrated example is hexagonal. After one set of the acoustic devices 34 have been picked up by one bank 102 of the placement tools 68, the bank 102 is rotated to the transport position shown in FIG. 13, and the other bank 100 is rotated to its pickup position, following which the placement tools 68 in bank 100 proceed to pick up the remaining set of acoustic devices 34 from the table 95.

Figure 17:
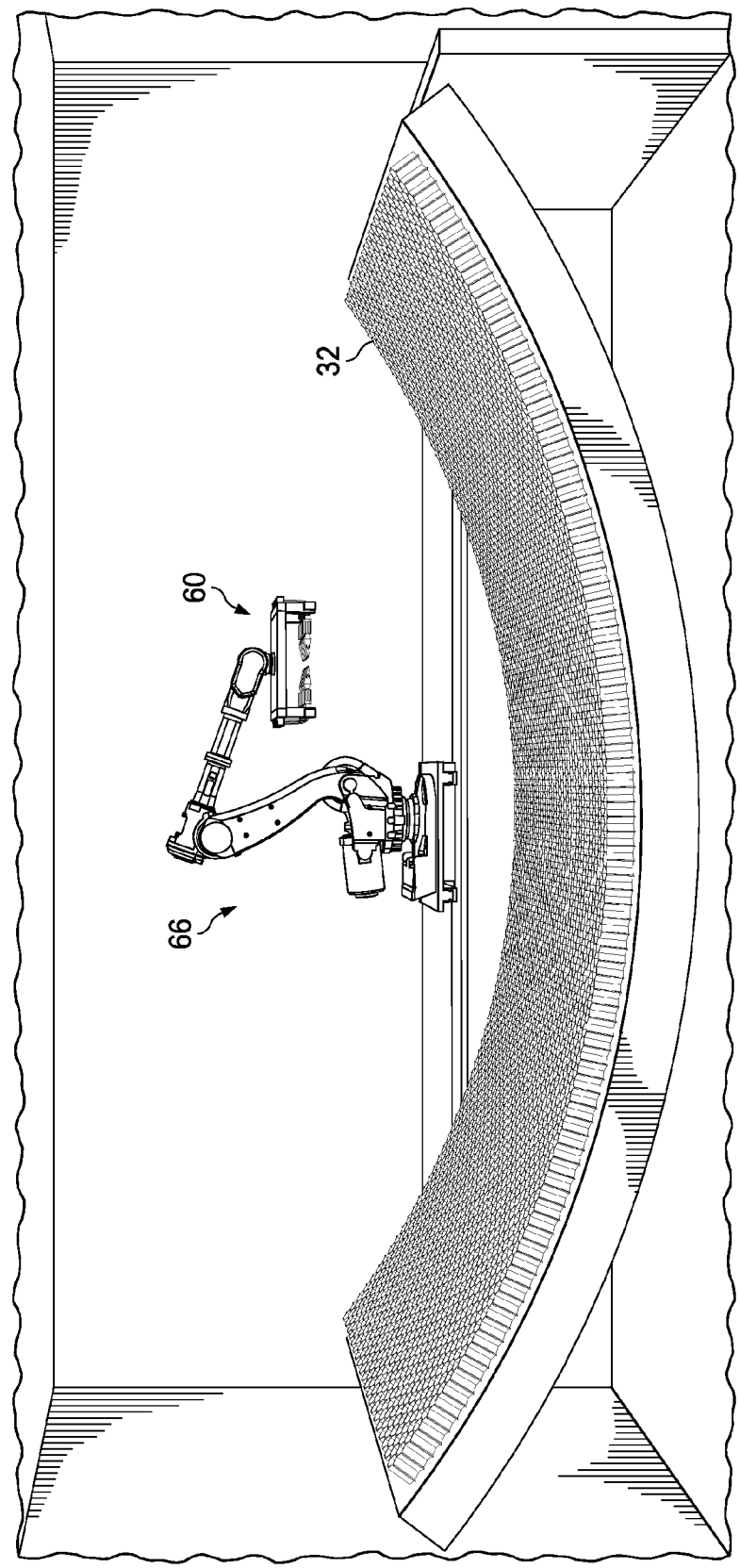
FIG. 17 is an illustration of an isometric view showing a curved segment of a cellular core in which septa are to be placed by the end effector.
Figure 18:
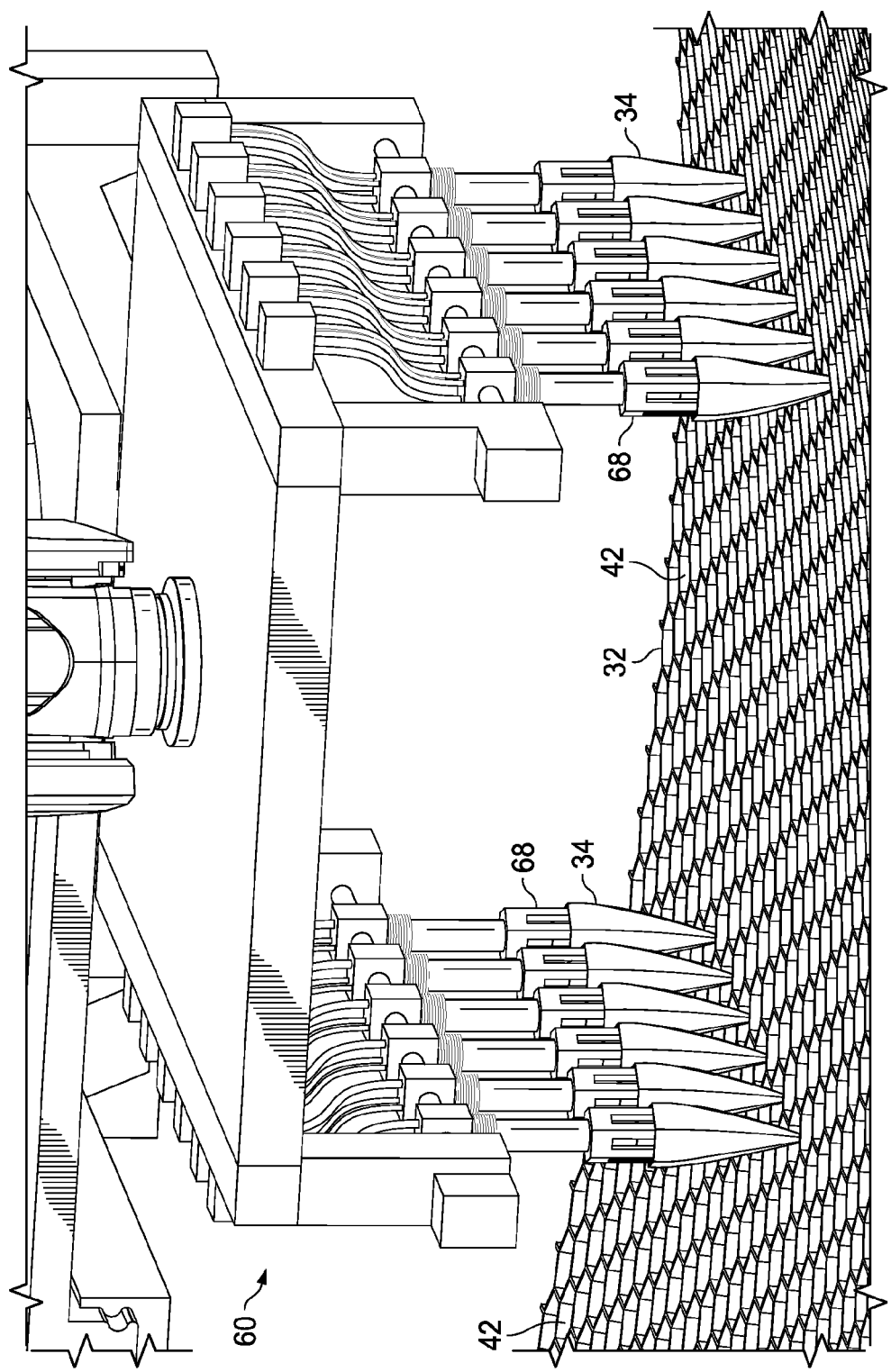
FIG. 18 is an illustration of a perspective view showing the end effector having positioned the placement tools above individual cells of the core.
Figure 19:
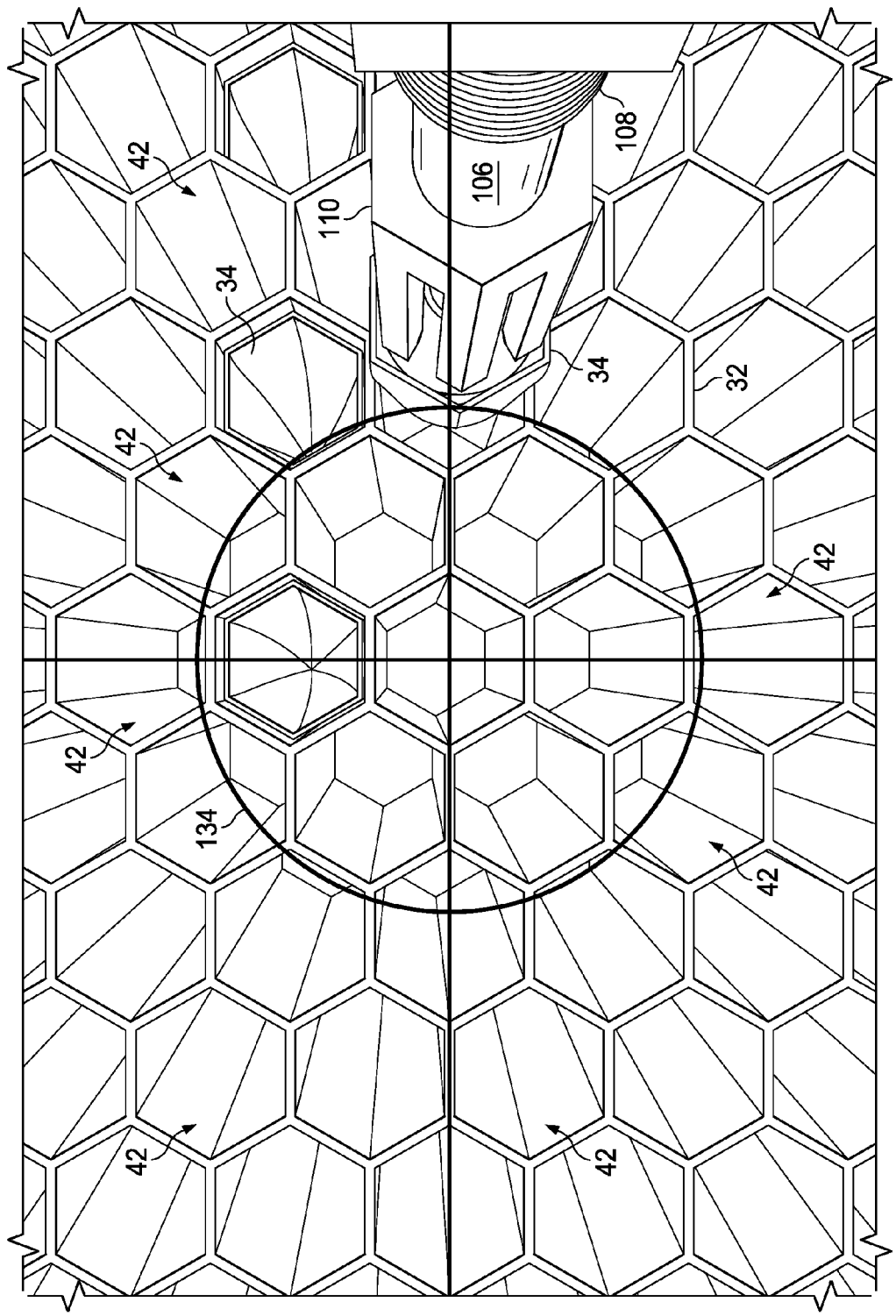
FIG. 19 is an illustration of an isometric view showing how the vision system aligns the placement tools relative to the cells, and wherein one of the septums is being placed in a cell by one of the placement tools.

Referring now to FIGS. 17-19, with a full set of the acoustic devices 34 having been picked up by the end effector 60, the robot 66 (FIG. 17) transports the end effector 60 to the vicinity of the core 32, which, in the illustrated example is curved. One or more laser guidance spots are directed from the end effector 60 onto the cellular core 32, and a camera system 76 (FIG. 3) views the surface of the cellular core 32 and detect laser spots. The vision system 72 along with the digital controller 80 cooperate to adjust 134 (FIG. 19) the position of the end effector 60 such that the placement tools 68 are precisely aligned with the centerlines of a group of the core cells 42.

With the placement tools 68 having been aligned with the core cells 42, the end effector 60 displaces the placement tools 68 toward the core 32, thereby placing and inserting the acoustic devices 34 in a chosen set of the core cells 42. The acoustic devices 34 are inserted to a desired, preprogrammed depth within the core cells 42, which in the illustrated example results in the top of the acoustic devices 34 being located at the top of the core cells 42 (see FIGS. 1 and 2).

Figure 21:
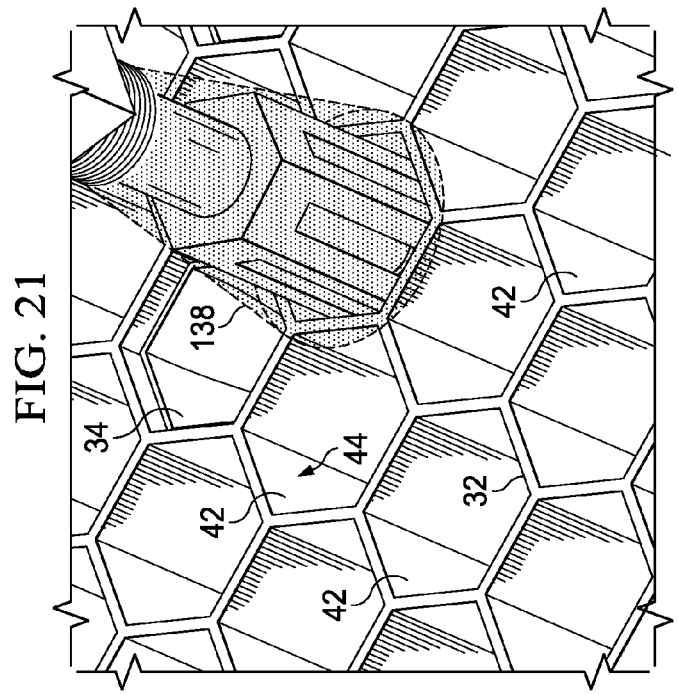
FIG. 21 is illustration of an enlarged perspective view, better showing how radiant thermal energy is transmitted from the placement tool to the area of the adhesive.
Figure 20:
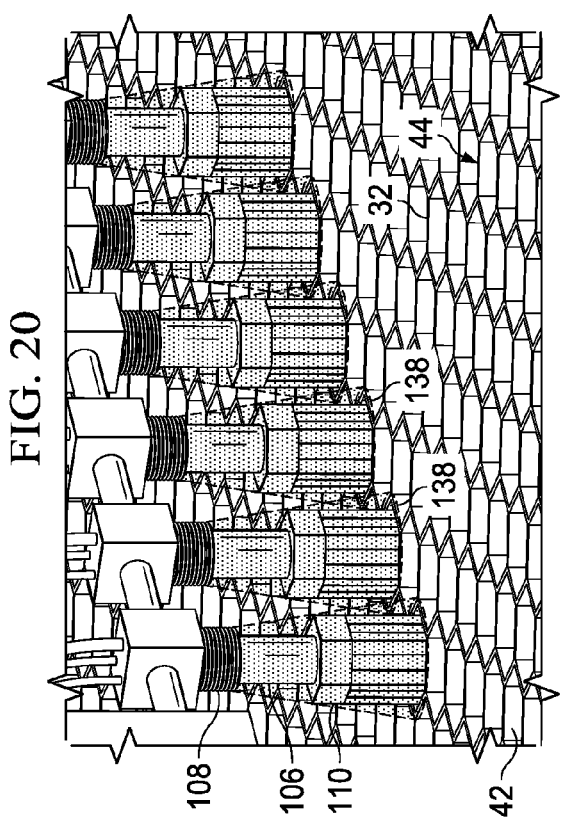
FIG. 20 is an illustration of a perspective view showing curing of the adhesive by radiant thermal energy.
Figure 22:
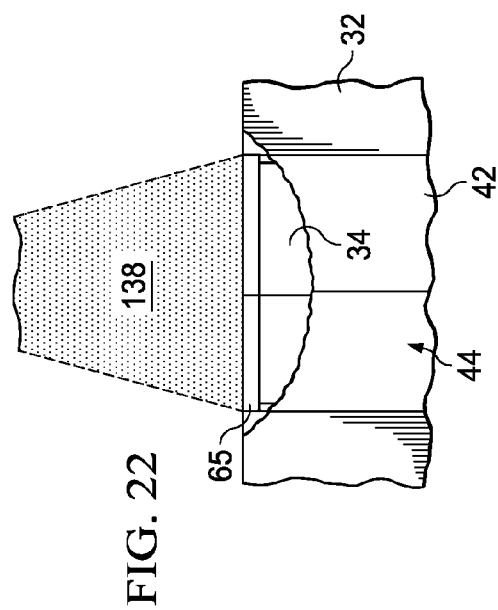
FIG. 22 is an illustration of a diagrammatic view showing thermal radiant energy used to bond the acoustic device to the cellular core, portions of a cell wall being broken away to reveal an adhesive ribbon.

Attention is now directed to FIGS. 20-22 which illustrate the process for adhesively bonding the acoustic devices 34 to the cellular core 32 after the end effector 60 has placed a set of the acoustic devices 34 within the cells 42. A curing device 78 surrounds each of the spindles 106 and is operative to direct thermal radiation 138, or other forms of radiation, onto the top of the acoustic devices 34. The thermal radiation 138 heats the adhesive 65 surrounding the acoustic device 34 to the cure temperature of the adhesive, thereby bonding the acoustic device 34 to the cell walls 44.

In one embodiment, each of the curing devices 78 may comprise a laser diode or a ring of laser diodes, however other types of devices cap the adhesive 65 may be employed. Also, while the curing devices 78 are mounted on the placement tools 68 in the illustrated embodiment, it may be possible to mount the curing devices 78 at other locations on the end effector 60. Depending upon the type of adhesive 65 being employed, it may be possible to achieve curing of the adhesive using other types of radiation, such as ultrasonic, UV or other form of energy.

Figure 23:
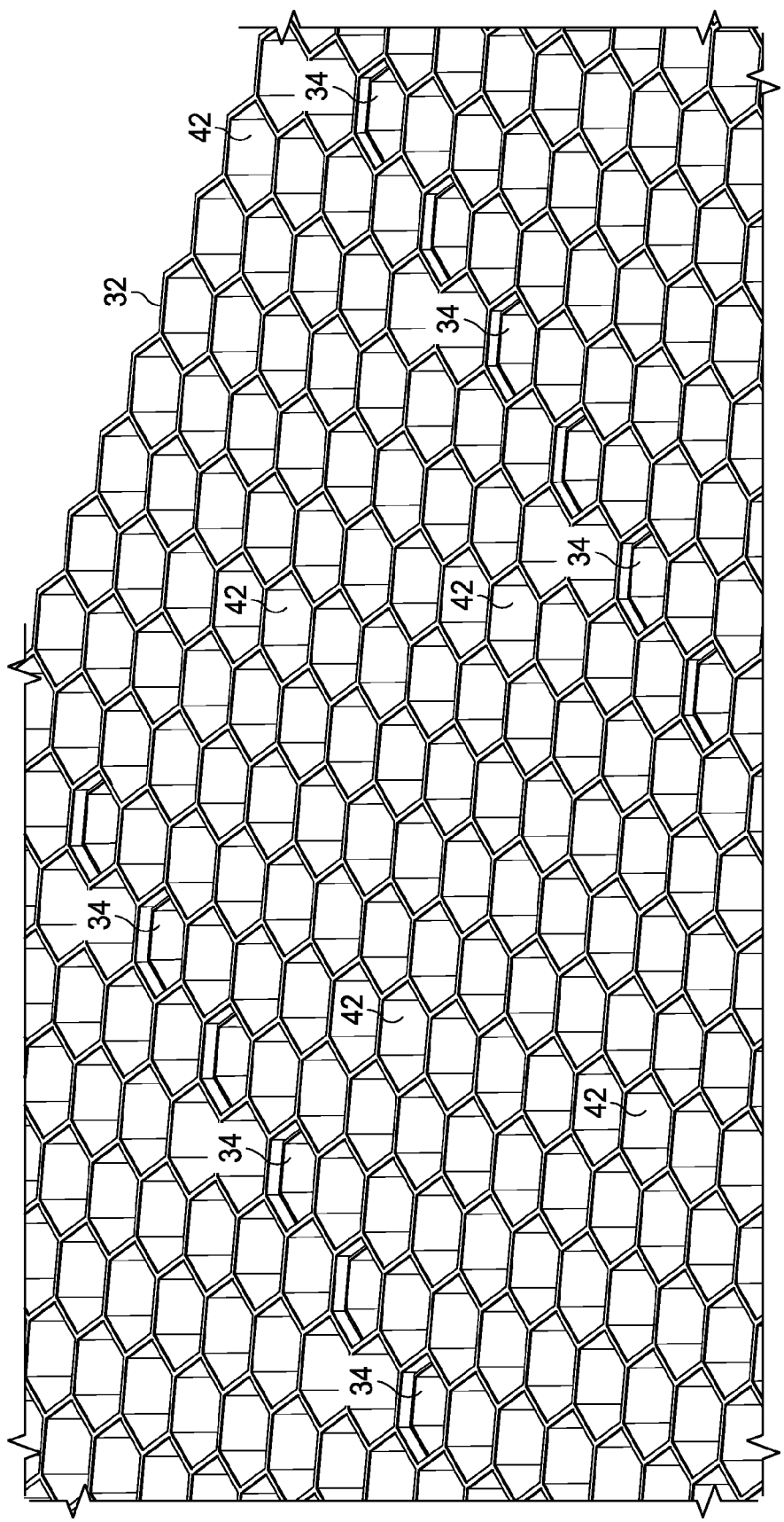
FIG. 23 is an illustration of a perspective view of a portion of the cellular core shown in FIG. 17 after several septums have been placed and bonded in place.

After the acoustic devices 34 have been bonded within the core cells 42, the vacuum holding the acoustic devices 34 on the placement tools 68 is removed, thereby releasing the acoustic devices 34 from placement tools 68. Once the vacuum is removed, the end effector 60 moves upwardly away from the cellular core 32, withdrawing the placement tools 68 from the acoustic devices 34. In some applications, slight positive pressure may be applied through the vacuum pickups 120 (see FIG. 14) to assure that there is a full release of the acoustic devices 34 from the placement tools 68. FIG. 23 illustrates a cellular core 32 in which a set of the acoustic devices 34 have been placed and bonded within core cells 42.

Figure 24:
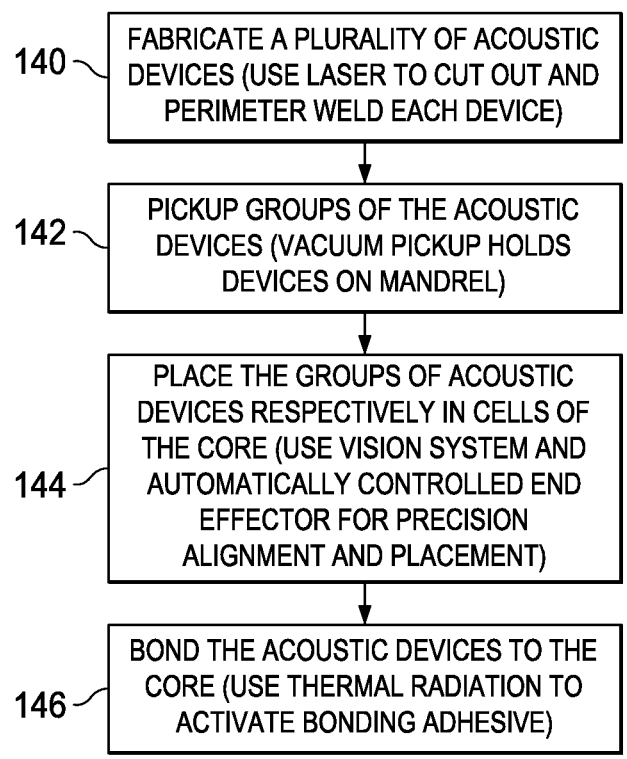
FIG. 24 is an illustration of a flow diagram of a method of automated production of acoustic structures.

FIG. 24 illustrates the overall steps of a method of placing in bonding a plurality of acoustic devices 34 in a cellular core 32, employing embodiments of the apparatus described above. Beginning at 140, a plurality of acoustic devices 34 are fabricated, using a laser 62 or other device to cut out and perimeter weld each of the devices 34. At 142 groups of the acoustic devices 34 are picked up using placement tools 68 having vacuum pickups 120 that holds the acoustic devices 34 on mandrels 104 forming part of the placement tools 68.

At 144 the groups of the acoustic devices 34 that have been picked up, are then placed respectively in cells 42 of the core 32. A machine vision system 72 along with an automatically controlled the end effector 60 is used to precisely align and place the acoustic devices 34 in the core cells 42. At 146, the acoustic devices 34 are adhesively bonded to the core 32 using thermal, UV or other form of radiation 138 to activate a bonding adhesive 65 applied to the acoustic devices 34.

Embodiments of the disclosure may find use in a variety of potential applications, particularly in the transportation industry, including for example, aerospace, marine, automotive applications and other application where acoustic treatments, such as acoustic liners, may be used. Thus, referring now to FIGS. 25 and 26, embodiments of the disclosure may be used in the context of an aircraft manufacturing and service method 148 as shown in FIG. 25 and an aircraft 150 as shown in FIG. 26. Aircraft applications of the disclosed embodiments may include, for example, without limitation, acoustic liners for sound attenuation in jet engines. During pre-production, exemplary method 148 may include specification and design 152 of the aircraft 150 and material procurement 154. During production, component and subassembly manufacturing 156 and system integration 158 of the aircraft 150 takes place. Thereafter, the aircraft 150 may go through certification and delivery 160 in order to be placed in service 162. While in service by a customer, the aircraft 150 is scheduled for routine maintenance and service 164, which may also include modification, reconfiguration, refurbishment, and so on.

Each of the processes of method 148 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 26, the aircraft 150 produced by exemplary method 148 may include an airframe 166 with a plurality of systems 168 and an interior 170. Examples of high-level systems 168 include one or more of a propulsion system 172, an electrical system 174, a hydraulic system 176 and an environmental system 178. Any number of other systems may be included. Although an aerospace example is shown, the principles of the disclosure may be applied to other industries, such as the marine and automotive industries.

Systems and methods embodied herein may be employed during any one or more of the stages of the production and service method 148. For example, components or subassemblies corresponding to production process 156 and 158 may be fabricated or manufactured in a manner similar to components or subassemblies produced while the aircraft 150 is in service. Also, one or more apparatus embodiments, method embodiments, or a combination thereof may be utilized during the production stages 156 and 158, for example, by substantially expediting assembly of or reducing the cost of an aircraft 150. Similarly, one or more of apparatus embodiments, method embodiments, or a combination thereof may be utilized while the aircraft 150 is in service, for example and without limitation, to maintenance and service 164.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for producing an acoustic structure having a core with a plurality of cells, comprising:
    a manipulator;
    an end effector mounted on the manipulator, including a plurality of acoustic device placement tools each capable of placing an acoustic device in one of the cells of the core, wherein the tool is elongate and tapered along its length;
    a digital controller including a set of digital instructions for controlling movement of the manipulator and operation of the end effector; and
    a material supply system for supplying overlapping ribbons of acoustic material and ribbons of adhesive material that overlap and adhere to the ribbons of acoustic material.

2. The apparatus of claim 1, wherein the acoustic device placement tools are arranged in first and second opposing banks thereof.

3. The apparatus of claim 1, wherein each of the acoustic device placement tools is mounted on the end effector for pivotal movement between an acoustic device pick-up position and an acoustic device placement position.

4. The apparatus of claim 1, wherein each of the acoustic device placement tools includes a mandrel capable of being inserted into the acoustic device.

5. The apparatus of claim 4, wherein each of the acoustic device placement tools includes a vacuum pickup for holding an acoustic device on the mandrel.

6. The apparatus of claim 4, wherein each of the acoustic device placement tools further includes a plurality of fingers shiftable into an end of the acoustic device for shaping the end of the acoustic device to match the cells.

7. The apparatus of claim 1, further comprising:
    a vision system for guiding the end effector and aligning each of the acoustic device placement tools with one of the cells of the core.

8. The apparatus of claim 7, wherein the vision system includes:
    a laser mounted on the end effector for directing a laser spot onto the core; and
    a camera mounted on the end effector for viewing the cells of the core.

9. The apparatus of claim 1, further comprising:
    a laser coupled with the digital controller for cutting the acoustic ribbons into a shape of the acoustic devices.

10. The apparatus of claim 1, further comprising:
    a device coupled with each of the acoustic device placement tools for curing the ribbons of adhesive material.

11. The apparatus of claim 10, wherein the device comprises a thermal radiation generator capable of directing thermal radiation onto the adhesive ribbon.

12. An apparatus for automated production of an acoustic core having a plurality of cells, comprising:
    a material supply system for supplying ribbons of acoustic material;
    a laser for converting the ribbons into a plurality of acoustic devices;
    an end effector for picking up the acoustic devices and placing the acoustic devices in the cells; and,
    a controller coupled with the laser and the end effector.

13. The apparatus of claim 12, wherein the material supply system includes two spools of acoustic ribbons capable of being drawn away from spools in overlapping relationship to each other.

14. The apparatus of claim 12, wherein the material supply system further includes two spools of adhesive ribbons capable of being drawn away from the spools in laterally spaced relationship to each other and overlapping the ribbons of acoustic material.

15. The apparatus of claim 12, wherein the controller is capable of controlling operation of the laser and includes a set of programmed instructions that direct the laser to cut out the acoustic devices from the ribbons of acoustic material.

16. The apparatus of claim 12, wherein the end effector includes a plurality of acoustic device placement tools each capable of placing an acoustic device in one of the cells of the acoustic core.

17. The apparatus of claim 16, wherein each of the acoustic device placement tools includes:
    a mandrel insertable into one of the acoustic devices, and
    a vacuum system coupled with the mandrel and capable of generating a vacuum within the acoustic device for holding the acoustic device on the mandrel.

18. The apparatus of claim 16, wherein each of the acoustic device placement tools includes a shaper and shiftable into an end of the acoustic device for shaping the end of the acoustic device to match the cells.

19. The apparatus of claim 16, further comprising:
    a vision system coupled with the controller for aligning the acoustic device placement tools with each of the cells of the acoustic core.

20. An apparatus for installing an acoustic device in a cell of a cellular core, wherein the acoustic device is generally hollow, the apparatus comprising:

a tool capable of being inserted into the acoustic device, wherein the tool is elongate and tapered along its length;

a vacuum pickup on the tool capable of holding the acoustic device against the tool; and a shaper on the tool for shaping an end of the acoustic device, wherein the shaper includes fingers slidable over the tool and into the acoustic device.

21. The apparatus of claim 20, wherein the fingers are circumferentially spaced apart from each other around the tool.

22. The apparatus of claim 20, wherein each of the fingers has an outer tip shaped to form an end of the acoustic device to substantially match a shape of the cell.

23. The apparatus of claim 20, further comprising:

a radiation generator coupled with the tool and capable of directing radiation toward the acoustic device during installation of the acoustic device in the cell.

* * * * *

UNITED STATES PATENT AND TRADEMARK OFFICE
CERTIFICATE OF CORRECTION

PATENT NO. : 9,693,166 B2  
APPLICATION NO. : 14/313613  
DATED : June 27, 2017  
INVENTOR(S) : Herrera et al.

Page 1 of 1

It is certified that error appears in the above-identified patent and that said Letters Patent is hereby corrected as shown below:

In the Claims

Column 12, Line 58-59 change "a shaper and shiftable" to -- a shaper and is shiftable --

Signed and Sealed this  
Thirteenth Day of November, 2018

Andrei Iancu  
*Director of the United States Patent and Trademark Office*